United States Patent
Kramer et al.

(10) Patent No.: US 9,580,539 B2
(45) Date of Patent: Feb. 28, 2017

(54) FOAM INSULATION UNIT

(71) Applicant: Dow Global Technologies LLC, Midland, MI (US)

(72) Inventors: Hans Kramer, Kempraten-Jona (CH); Vanni Parenti, Campagnola (IT); Francois M. Casati, Pfaffikon (CH); Timothy A. Morley, Schindellegi (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/822,421

(22) Filed: Aug. 10, 2015

(65) Prior Publication Data
US 2015/0344611 A1 Dec. 3, 2015

Related U.S. Application Data

(63) Continuation of application No. 13/641,331, filed as application No. PCT/EP2011/055955 on Apr. 14, 2011, now abandoned.

(30) Foreign Application Priority Data

Apr. 21, 2010 (EP) ..................... 10425126

(51) Int. Cl.
| | | |
|---|---|---|
| B29C 65/00 | (2006.01) | |
| C08G 18/32 | (2006.01) | |
| B29C 45/00 | (2006.01) | |
| B29C 45/14 | (2006.01) | |
| B29C 45/16 | (2006.01) | |
| B29C 44/34 | (2006.01) | |
| C08J 9/14 | (2006.01) | |
| C08G 18/40 | (2006.01) | |
| C08G 18/48 | (2006.01) | |
| B29K 105/20 | (2006.01) | |
| B29K 105/04 | (2006.01) | |
| B29L 9/00 | (2006.01) | |
| C08G 101/00 | (2006.01) | |
| B29L 31/00 | (2006.01) | |
| B29K 105/00 | (2006.01) | |
| B29K 75/00 | (2006.01) | |

(52) U.S. Cl.
CPC ...... *C08G 18/3271* (2013.01); *B29C 44/3403* (2013.01); *B29C 45/0001* (2013.01); *B29C 45/14467* (2013.01); *B29C 45/1642* (2013.01); *B29C 45/1671* (2013.01); *C08G 18/3206* (2013.01); *C08G 18/3212* (2013.01); *C08G 18/4018* (2013.01); *C08G 18/482* (2013.01); *C08J 9/141* (2013.01); *B29C 2045/1454* (2013.01); *B29K 2075/00* (2013.01); *B29K 2105/0047* (2013.01); *B29K 2105/043* (2013.01); *B29K 2105/20* (2013.01); *B29K 2995/0015* (2013.01); *B29L 2009/00* (2013.01); *B29L 2031/7622* (2013.01); *C08G 2101/005* (2013.01); *C08G 2101/0025* (2013.01); *C08G 2105/02* (2013.01); *C08J 2375/04* (2013.01); *Y10T 428/233* (2015.01)

(58) Field of Classification Search
CPC ............ C08G 18/3271; B29C 44/3403; B29C 45/0001; B29C 45/14467
See application file for complete search history.

(56) References Cited

U.S. PATENT DOCUMENTS

| | | | | |
|---|---|---|---|---|
| 3,753,830 A | * | 8/1973 | Cruckshank | ............ B29C 51/00 156/382 |
| 4,972,002 A | | 11/1990 | Volkert | |

FOREIGN PATENT DOCUMENTS

| | | |
|---|---|---|
| CA | 2161065 A1 | 4/1996 |
| CN | 1176968 A | 3/1998 |
| DE | 10056251 A1 | 5/2002 |
| EP | 952169 A1 | 12/2005 |
| WO | 0005289 A1 | 2/2000 |
| WO | 2007058793 A1 | 5/2007 |
| WO | 2010/044361 A1 | 4/2010 |
| WO | 2010046361 A1 | 4/2010 |
| WO | 2011/131568 A1 | 10/2011 |

OTHER PUBLICATIONS 50 litre CTT50W10 Mini Fridge.
47 litre Ice King Small Table Top Fridge Refrigerator.
International Searching Authority Written Opinion for PCT/EP2011/005955, Issued Oct. 23, 2012.
European Extended Search Report for EP10425126.9, Issued Oct. 1, 2010.
Response to European Extended Search Report for EP10425126.9, filed May 16, 2012.

* cited by examiner

Primary Examiner — Joseph S. Del Sole
Assistant Examiner — Jon Robitaille

(57) ABSTRACT

Insulating unit are disclosed which are prepared by a cavity-filling, fast-gelling rigid polyurethane foam based on a formulation comprising a polyol component which contains at least 5 weight percent of an amine-initiated polyols and 1.4 to 4 parts by weight of a catalyst package whereby the catalyst package contains at least one amine catalyst and the weight percent nitrogen present in the amine-initiated polyol to weight percent nitrogen present in the catalyst system is from 2 to 8. The formulation is injected into the cavity and the pressure in the cavity is subjected to reduced atmospheric pressure to achieve the rigid foam having a thermal conductivity of less than about 19 mW/mK at 10° C. average plate temperature.

11 Claims, No Drawings

FOAM INSULATION UNIT

BACKGROUND OF THE INVENTION

1. Technical Field

This invention relates to insulating units composed of an isocyanate based foam injected into a cavity of cabinet comprising an inner and outer liner and a process for production of such insulating units.

2. Background of the Art

One of the most commercially important applications for rigid polyurethane foams is in the appliance industry. In this application the foams supply insulation from heat and/or cold, and may also serve to increase structural integrity and/or strength of the appliance. Frequently the foams are part of composite, sandwich-type constructions wherein at least one outer layer of a rigid or elastic material, such as, for example, paper, plastic film, rigid plastics, metal sheeting, glass nonwoven materials, chipboard, and the like is also included. In particular applications, such as refrigerators and freezers, the components of the rigid polyurethane foam may be injected into cavities, wherein the components first fill the cavity and then complete reaction to form the final rigid polyurethane foam. In order to ensure the necessary characteristics of the final foam in cavity-filling applications, it is particularly desirable to complete introduction of the foam-forming components within a relatively short time. Another important requirement for the rigid polyurethane foam is a good adhesion to the refrigerator cabinet or freezer housings.

An industrial process to manufacture refrigerators and freezers is described in PU Handbook by G. Oertel, Hanser publisher (1985). The refrigerator/freezer cabinet has a cavity of relatively complicated design with the housings made of metal and/or plastics. Fixtures support the prepared shell (outer wall surface) and liners (inner wall surface) of the housing against the resulting foam pressure and maintain the proper distance between them. The process generally involves injection of all the liquid reactants into the unit at one time as pouring of further liquid reactants into already rising foams can lead to imperfections and poor cell structure. In such processes, normal changes in atmospheric air pressure may strongly influence the foaming process.

In general, heat- and cold-insulating rigid polyurethane foams used as insulation in such units may be produced by reacting organic polyisocyanates with one or more relatively high viscosity compounds containing at least two reactive hydrogen atoms, such as polyester- and/or polyether-polyols, usually in the presence of low molecular weight chain extenders and/or cross-linking agents, in the presence of non ozone depleting blowing agents and catalysts. If desired, auxiliaries and/or additives may be further included. Choice of appropriate components enables production of rigid polyurethane foams having acceptably low thermal conductivity and desirable mechanical properties.

For example, Canadian Patent 2,161,065 discloses use of a formulation including components that contain, alone or in combination, at least 32 percent by weight of aromatic radicals. It is asserted therein that the relatively high aromaticity of the formulation serves to reduce the insulating performance (thermal conductivity) by at least 0.5 mW/mK, and also improves flame resistance and aging behavior of the foams.

The proper selection of blowing agents in such application has often been problematic. While chlorofluorocarbons (CFCs) have long been known to perform well in insulating foams, their use is progressively more restricted by law for environmental reasons. Thus, a body of art has arisen with the goal of reducing or eliminating CFC use while still achieving, or attempting to achieve, desirable insulation and mechanical performance close to the performance obtained with CFC's. This is particularly important because, as a general rule, the blowing agent remains in the rigid polyurethane foam for a considerable time as a cell gas. Thus, the cell gas itself, and not just the foam matrix, provides a very significant portion of the overall insulation performance of the foam. This is particularly so in applications such as appliances, where the generally very slow diffusion rate of the gas out of the cells is further slowed, or virtually prevented, by encasement of the foam in plastic or metal outer layer(s).

While selection of components of a foam-forming formulation is important in determining the insulating capability of a final rigid polyurethane foam, those skilled in the art have also had to address process-related issues, particularly as they relate to how processing variations affect the insulating and mechanical capabilities of the foams. Achieving optimum foam density, cell size, and especially uniformity, while also ensuring excellent cavity-filling or mold-filling performance, has challenged the industry to search for new ways to introduce the formulation components. For example, introduction may be achieved by single shot injection, simultaneous injection at multiple sites, positional variations of the mold or of a "cabinet," i.e., the container having the cavity that is destined to be filled by the polyurethane foam, and the like. The speed of movement of the formulation throughout the cavity relative to the rate of reaction may also be an important factor. The faster the foam gelation, the shorter is the gel (or string) time, hence it is more challenging to fill the cavity without voids due to the fast viscosity build-up of reactants. Short gelation times are also linked to fast tack free time, which presents challenges in obtaining proper flow of foam forming formulations and foam adhesion to walls of an insulating housing unit which contain one or more restrictions or angles.

Another issue of increasing importance is a reduction in the amount of amine catalyst used in the production of fast reacting polyurethane foam as such catalyst are potentially volatile which may contribute to environmental and safety issues.

To aid in distribution of a foam forming formulation in insulating units, foaming under reduced pressure has been proposed. For example, WO 2007/058793, describes a method of molding rigid polyurethane foams wherein a density/lambda (density/thermal insulation) ratio of 1.65 to 2.15 is achieved under a pressure of 300 to 950 mbar and a packing factor of 1.03 to 1.9. Still another example may be found in U.S. Pat. No. 5,439,945 A, which discloses foams that are prepared under a reduced pressure and subsequently encased in a material which prevents ambient air from entering the cell voids. The gas within the foam reaches equilibrium at a lesser pressure than in prior systems.

Despite the multitude of approaches to these problems, there remains a need in the art for insulating housing units and a process for the production of such units that enables safe, efficient, cost-effective production of closed cell rigid polyurethane foams as an insulating barrier that attain desirable molded densities and insulation factors while filling a cavity without voids and at the same time offering good mechanical properties, fast demoldability and good adhesion to refrigerator housings.

SUMMARY OF THE INVENTION

The present invention provides an insulating unit comprising at least two side walls, a back wall and a top wall wherein each wall comprises a polyurethane foam between an inner lining and an outer lining and the side walls are connected to the back wall and the top wall at an angle between 85 and 95°; the back wall and the side walls have a height of between 0.5 and 3 meters and the side walls have a width of between 0.5 and 1.5 meters and the back wall has a width of between 0.5 and 2.0 meters;

wherein the polyurethane foam disposed between the inner and outer liner has a thickness of 20 to 120 mm and is produced from a reaction mixture comprising:
an organic polyisocyanate;
a polyol formulation comprising a polyol component containing from 5 to 85 weight percent of at least one amine-initiated polyol an nominal average functionality of 3 to 8 and an average hydroxyl number of from 200 to 850,
from 1 to 5 parts by weight of a catalyst system per 100 parts by weight of the polyol formulation wherein the catalyst system comprises at least one amine catalyst, a non-chlorofluorocarbon physical blowing agent; and
an amount of water that is less than 2 percent by weight based on the formulation,
wherein the weight percent of nitrogen in the polyol formulation, excluding the weight of the blowing agent, derived from the polyol component (Npol), is from 1 to 5, the ratio of the nitrogen from the polyol to the ratio of weight percent nitrogen from the catalyst system is from 2 to 8 and the reaction mixture forms a gel in no more than 30 seconds.

In a further embodiment the invention provides a process for preparing an insulating unit comprising at least two side walls, a back wall and a top wall wherein each wall comprises a polyurethane foam between an inner lining and an outer lining and the side walls are connected to the back wall and the top wall at an angle between 85 and 95°; the back wall and the side walls have a height of between 0.5 and 3 meters and the side walls have a width of between 0.5 and 1.5 meters and the back wall has a width of between 0.5 and 2.0 meters and wherein the polyurethane foam disposed between the inner and outer liner has a thickness of 20 to 120 mm and is produced from a reaction mixture comprising;
(a) preparing a reactive foam-forming system comprising as components at least an organic polyisocyanate;
a polyol formulation comprising a polyol component containing from 5 to 85 weight percent of at least one amine-initiated polyol, an nominal average functionality of 3 to 8 and an average hydroxyl number of from 200 to 850,
from 1 to 5 parts by weight of a catalyst system per 100 parts by weight of the polyol formulation wherein the catalyst system comprises at least one amine catalyst,
wherein the weight percent of nitrogen in the formulation, excluding the weight of the blowing agent, derived from the polyol component (Npol) is from is from 1 to 5 and the ratio of the nitrogen from the polyol to the ratio of nitrogen from the catalyst system is from 2 to 8;
(b) injecting the reactive foam-forming system at or above atmospheric pressure into a cavity, wherein the reactive foam-forming system forms a gel in no more than 25 30 seconds
(c) subjecting the cavity to a reduced atmospheric pressure; and
(d) maintaining the reduced atmospheric pressure at least until the gel forms a closed cell rigid polyurethane foam, the foam having a density of from 28 to 40 kg/m$^3$, an average cell diameter of less than about 250 microns, and a thermal conductivity of less than about 19 mW/mK at 10° C. average plate temperature, according to ISO 12939/DIN. 52612.

It was unexpectedly found that a fast gelling polyurethane system, with specific catalysis based on a combination of amine catalysts and amine initiated polyols, combined with a reduction of atmospheric pressure in a complex mold cavity during foaming, gives refrigerators and/or freezers with good thermal insulation properties. In particular, it was unexpected that highly viscous foam formulations, with a short gel time, could pass through the various angles and/or restriction in a complex mold such as used in a refrigerator at density ranging from 28 to 40 kg/m3 as achieved using slower reactivity polyurethane formulations. The present invention also provides good adhesion between the foam and the liners.

DETAILED DESCRIPTION OF THE INVENTION

The invention provides an insulating housing unit (cabinet) having at least two side walls, a back wall and top wall wherein each wall comprises a polyurethane foam between an inner lining and an outer lining and the side walls are connected to the back wall and the top wall at an angle of between 85 and 95°. Generally the angle will be close to 90°. The invention further provides for a formulation for use within such insulating units and a process whereby a formulation for a closed cell rigid polyurethane foam is injected or poured into a cavity formed by the other and inner lining of the wall housing. In applications highly driven by energy efficiency, such as refrigerators and freezers, the application of closed cell rigid polyurethane foam may be combined with the use of vacuum insulation panels (VIP) inserted in the cavity structure. The housing cavity can also contain wires and/or pipes needed for the refrigerator functioning.

When the insulating unit is in the form of an appliance, such as a refrigerator, the unit will generally comprise 2 side walls, a back wall a top wall and optionally a bottom wall. The side walls will generally have a length (height) of 0.5 to 3 meters. In further embodiment, the side walls will generally have a length of 1.0 meter or greater and a height of less than 2.3 meters. The width of the side walls will generally be from 0.5 to 1.0 meters. The width of the wall will define what is generally regarded the depth of a refrigerator. In a further embodiment the side walls will have a width of at least 0.6 meters. The back wall will generally have a height which corresponds to the height of the side walls. The width of the back wall will generally range from 0.5 to 2.0 meters. Optionally, the refrigerator may contain one or more inner walls, generally running parallel to the side walls, to create an additional dividing component within the refrigerator unit, for instance to separate the cold zone from the freezing zone. Alternatively, additional wall or walls may be present essentially perpendicular to the back and side walls to separate a cold zone from a freezing zone, creating top and bottom compartments within a refrigerator. The refrigeration unit generally contains a top wall connected to the side and back walls. The dimension of the top unit is preferably selected to correspond to the width of the back and side walls. Depending on the refrigerator design, the unit may also contain a bottom wall.

When the insulating unit is an appliance, such as a chest freezer, the insulating unit will generally comprise a front wall, a back wall, two side walls and a bottom wall. The front wall, back wall and side walls will be in connected with the bottom wall at an angle of 85 to 95°. Generally the angle will be close to 90°. The front and back wall can range from 1 to 3 meters and the side walls will generally be from 0.5 to 1.5 meters.

In general the thickness of the polyurethane foam is from 20 to 120 mm. In a further embodiment the thickness of the polyurethane foam will be less than 100 mm.

The use of the term "connected" with respect to the various wall means the cavity formed by the inner and outer layers of the insulating space is continuous throughout the insulating unit.

The use of the weight percent based on the "polyol formulation" refers to the total weight of the polyol component, water, catalyst package, and any surfactant. Calculations based on weight of polyol formulation do not include the weight of the physical blowing agent and any additional additives which may be present.

The walls of appliances such as refrigerators and freezers are most conveniently insulated in accordance with the invention by first assembling an outer shell and in interior liner together, such that a housing cavity is formed between the shell and liner. Typically, the shell and liner are bonded together in some way, such as by welding, melt-bonding or through use of some adhesive (or some combination of these) prior to introduction of the foam formulation. The shell and liner may be supported or held in the correct relative positions using a jig or other apparatus. One or more inlets to the cavity are provided, through which the foam formulation can be introduced.

The materials of construction of the shell and liner are not particularly critical, provided that they can withstand the conditions of the curing and expansion reactions of the foam formulation. In most cases, the materials of construction will be selected with regard to specific performance attributes that are desired in the final product. Metals such as steel are commonly used as the shell, particularly in larger appliances such as freezers or refrigerators. Plastics such as polycarbonates, polypropylene, polyethylene styrene-acrylonitrile resins, acrylonitrile-butadiene-styrene resins or high-impact polystyrene are used more often to make shells for smaller appliances (such as coolers) or those in which low weight is important. The liner may be a metal, but is more typically a plastic as just described.

The formulation used for producing the isocyanate based insulating foam includes at least one organic polyisocyanate. Suitable polyisocyanates may be aliphatic, cycloaliphatic, araliphatic, aromatic polyisocyanates, or combinations thereof. Such may include, for example, alkylene diisocyanates, particularly those having from 4 to 12 carbon atoms in the alkylene moiety, such as 1,12-dodecane diisocyanate, 2-ethyltetramethylene 1,4-diisocyanate, 2-methyl-pentamethylene 1,5-diisocyanate, 2-ethyl-2-butylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixture of these isomers, 1-isocyanato-3,3,5-trimethyl-5-isocyanato-methylcyclohexane (isophorone diisocyanate), 2,4- and 2,6-hexahydrotolylene diisocyanate, and the corresponding isomer mixtures, 4,4-, 2,2'- and 2,4'-dicyclohexylmethane diisocyanate and the corresponding isomer mixtures, araliphatic diisocyanates, e.g., 1,4-xylylene diisocyanate and xylylene diisocyanate isomer mixtures, and preferably aromatic diisocyanates and polyisocyanates, e.g., 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI), and mixtures of crude MDI and tolylene diisocyanates. The organic diisocyanates and polyisocyanates may be employed individually or in the form of combinations thereof.

The organic polyisocyanates may be prepared by known processes. They are preferably prepared by phosgenation of the corresponding polyamines with formation of polycarbamoyl chlorides and thermolysis thereof to give the organic polyisocyanate and hydrogen chloride, or by phosgene-free processes, such as for example by reacting the corresponding polyamines with urea and alcohol to give polycarbamates, and thermolysis thereof to give the polyisocyanate and alcohol.

Modified polyisocyanates may also be used, that is, products which are obtained by chemical reaction of organic diisocyanates and/or polyisocyanates. Specific examples are ester-, urea-, biuret-, allophanate-, uretoneimine-, carbodiimide-, isocyanurate-, uretdione- and/or urethane-containing diisocyanates and/or polyisocyanates. Individual examples are urethane-containing organic, preferably aromatic, polyisocyanates containing from 33.6 to 15 percent by weight, preferably from 31 to 21 percent by weight, of NCO, based on the total weight. Examples include 4,4'-diphenylmethane diisocyanate, 4,4'- and 2,4'-diphenylmethane diisocyanate mixtures, or crude MDI or 2,4- or 2,6-tolylene diisocyanate, in each case modified by means of low molecular weight diols, triols, dialkylene glycols, trialkylene glycols or polyoxyalkylene glycols having molecular weight of up to about 6,000. Specific examples of di- and polyoxyalkylene glycols, which may be employed individually or as mixtures, are diethylene, dipropylene, polyoxyethylene, polyoxypropylene and polyoxy-propylene-polyoxyethylene glycols, triols and/or tetrols. NCO-containing prepolymers containing from 25 to 3.5 percent by weight, preferably from 21 to 14 percent by weight, of NCO, based on the total weight, and prepared from the polyester- and/or preferably polyether-polyols described hereinbelow and 4,4'-diphenylmethane diisocyanate, mixtures of 2,4'- and 4,4'-diphenylmethane diisocyanate, 2,4- and/or 2,6-tolylene diisocyanates or crude MDI are also suitable. Furthermore, liquid polyisocyanates containing carbodiimide groups and/or isocyanurate rings and containing from 33.6 to 15 percent by weight, preferably from 31 to 21 percent by weight, of NCO, based on the total weight, e.g., based on 4,4'-, 2,4'- and/or 2,2'-diphenylmethane diisocyanate and/or 2,4' and/or 2,6-tolylene diisocyanate, may also prove successful.

The modified polyisocyanates may be mixed with one another or with unmodified organic polyisocyanates, e.g., 2,4'- or 4,4'-diphenylmethane diisocyanate, crude MDI, and/or 2,4- and/or 2,6-tolylene diisocyanate.

Organic polyisocyanates which may also be particularly successful may further include mixtures of modified organic polyisocyanates containing urethane groups, having an NCO content of from 33.6 to 15 percent by weight, in particular those based on tolylene diisocyanates, 4,4'-diphenylmethane diisocyanate, diphenylmethane diisocyanate isomer mixtures or crude MDI, in particular 4,4'-, 2,4'- and 2,2'-diphenylmethane diisocyanate, polyphenyl-polymethylene polyisocyanates, 2,4- and 2,6-tolylene diisocyanate, crude MDI having a diphenylmethane diisocyanate isomer content of from about 30 to about 80 percent by weight, preferably from about 35 to about 45 percent by weight, and mixtures of at least two of the above-indicated polyisocyanates, for example, crude MDI or mixtures of tolylene diisocyanates and crude MDI. Preferred isocyanates are MDI based such as Voratec SD 100, Voranate M-220 or Voranate M-229, available from The Dow Chemical Company.

The polyol component used in the foam-forming formulation comprises from at least 5 to 85 percent by weight of an amine-initiated polyol that contains at least two reactive hydrogen atoms. This polyol generally has a functionality of from 2 to 8, preferably 3 to 8, and an average hydroxyl number preferably from about 200 to about 850, preferably from about 300 to about 770. Amine initiated polyols, due to the presence of nitrogen atoms, may have catalytic activity, mainly with respect to foam curing, and may have an influence on the blowing reaction.

The amine-initiated polyol is generally selected such that the weight percent of the nitrogen (Npol) in the polyol component is from 1.6 to 5 percent of the total polyol formulation. In a further embodiment, the nitrogen from the amine initiated polyols is less than 4.8, less than 4.5 or less than 4.3 weight percent of the total polyol formulation. To obtain the desired level of Npol, in a further embodiment, the polyol component of the amine-initiated polyol may constitute at least 22, 25 or 28 percent by weight of the polyol component. In further embodiments the amine initiated polyols will comprise less than 80, less than 75 or less than 70 percent by weight of the polyol composition. Npol is calculated as follows: Npol=number of Nitrogen atoms in the amine-polyol multiplied by the Atomic weight of the Nitrogen and multiplied by the weight percent of the amine polyol in the total polyol formulation (excluding physical blowing agent) divided by the molecular weight of the amine polyol. In case of more than one type of amine initiated polyols in the formulation, the Npol of the total polyol formulation is the sum of the Npol of each of the individual amine initiated polyols.

Examples of suitable amine-initiators include alkanolamines, e.g., ethanolamine, N-methyl- and N-ethylethanolamine, dialkanolamines, e.g., diethanolamine, N-methyl- and N-ethyldiethanolamine, and trialkanolamines, e.g., triethanolamine, and ammonia, Other amine-initiators include unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, diethylenetriamine, triethylenetetramine, 1,3-propylene-diamine, 1,3- and 1,4-butylene diamine, 1,2-, 1,3-, 1,4-, 1,5- and 1,6-hexamethylenediamine. Other suitable aliphatic amine initiators include 3,3'-diamino-N-methyldipropylamine and dimethyl amino propyl amino propyl amine.

In a further embodiment the initiator for the amine-initiated polyols is an aromatic amine; a cyclo-aliphatic amine; methylene bis(cyclohexylamine; 1,2-, 1,3- or 1,4-bis (aminomethyl)cyclohexane; an aminocyclohexanealkylamine; 2- or 4-alkylcyclohexane-1,3-diamine; isophorone diamine or a combination or diastereomeric forms thereof. Examples of suitable aromatic amine initiators for use in the present invention include 1,2-, 1,3- and 1,4-phenylenediamine; 2,3-, 2,4-, 3,4- and 2,6-toluene diamine; 4,4'-, 2,4'- and 2,2'-diaminodiphenylmethane; polyphenyl-polymethylene-polyamine. In one embodiment polyol component (b) is a toluene diamine (TDA)-initiated polyol, and even more preferably wherein at least 85 weight percent of the TDA is ortho-TDA.

One class of aminocyclohexanealkylamine compounds includes those represented by structure I:

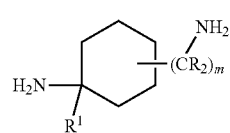

(I)

wherein $R^1$ is $C_1$-$C_4$ alkyl, and wherein each R is independently hydrogen or C1-C4 alkyl and m is a number from 1 to 8. Each R group in structure I is preferably independently hydrogen or methyl, and $R^1$ is preferably methyl. In structure I, the —$(CR_2)_m$—$NH_2$ group may be ortho, meta or para to the amino group bonded directly to the cyclohexane ring. The —$NH_2$ and —$(CR_2)_m$—$NH_2$ groups in structure I may be in the cis- or trans-positions with respect to each other. In structure I, the cyclohexane carbon atoms may contain inert substituent groups in addition to the —$NH_2$, —$R^1$ and —$(CR_2)_m$—$NH_2$ groups shown. A preferred initiator compound corresponding to structure I is cyclohexanemethanamine, 4-amino-α,α,4-trimethyl-(9Cl), which is also known as p-menthane-1,8-diamine or 1,8-diamino-p-menthane.

A second type of aminocyclhexanealkylamine initiator corresponds to structure II:

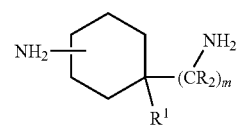

(II)

in which R, $R_1$ and m are as defined before. As in structure I, each R group in structure II is preferably independently hydrogen or methyl and $R^1$ is preferably methyl. In structure II, the —$(CR_2)_m$—$NH_2$ group may be ortho, meta or para to the amino group bonded directly to the cyclohexane ring. The —$NH_2$ and —$(CR_2)_m$—$NH_2$ groups in structure II may be in the cis- or trans-positions with respect to each other. In structure II, the cyclohexane carbon atoms may contain inert substituent groups in addition to the —$NH_2$, —$R^1$ and —$(CR_2)_m$—$NH_2$ groups shown. An especially preferred initiator compound that corresponds to structure 11 is 5-amino-1,3,3-trimethylcyclohexanemethylamine. The production of the above described aminocyclhexanealkylamines is given in WO 2008/094239.

Cyclohexanediamines initiators include those as disclosed in WO 2008/094963 such as 1,2-, 1,3-, or 1,4 cyclohexanediamine, 2 or 4 methylcyclohexane-1,3-diamine and diastereoisomeric forms thereof. The 1,2-cylohexanediamines can be represented by structure III:

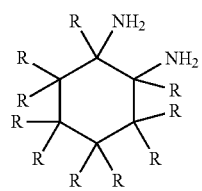

(III)

wherein each R is independently hydrogen or $C_1$-$C_4$ alkyl. Each R is preferably hydrogen or methyl. Examples of such initiators are 1,2-cyclohexanediamine commercially available as Dytek® DCH 99 and 1,4-cyclohexanediamine commercially available as 1,4-DCH.

Further amine-initiated polyols useful in the present invention are those produced from at least one methylene bis(cyclohexylamine) initiator compound. A "methylene bis(cyclohexylamine)" initiator compound, is a compound that contains a methylene group which is substituted with two cyclohexyl groups. The cyclohexyl groups may be unsubstituted or inertly substituted. The methylene bis(cyclohexylamine) initiator compound can be represented by structure (IV):

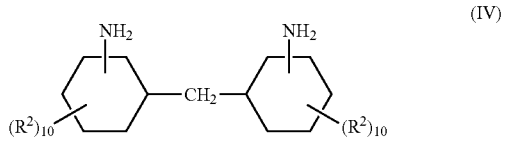

wherein each $R^2$ is hydrogen or an inert substituent. The $NH_2$ groups may be in the 2, 3 or 4 positions. The two $NH_2$ groups may be assemetrically positioned with respect to the central methylene group. Preferred isomers are the 2,2', 4,4' and 2,4' isomers.

Each $R^2$ is preferably hydrogen, but any one or more of the $R^2$ groups may be an inert substitutent. An "inert" substituent is one that (1) is not reactive with an alkylene oxide under the conditions of alkoxylation (as described more below), (2) is not reactive with isocyanate groups and (3) does not significantly affect the ability of the methylene bis(cyclohexylamine) compound to become alkoxylated and of the resulting polyol to react with a polyisocyanate to form urethane linkages. Inert substituent include hydrocarbyl groups such as alkyl, alkenyl, alkynyl, aryl, aryl-substituted alkyl, cycloalkyl and the like, ether groups, tertiary amino groups, and the like. It is preferred that any substituent groups that may be present are $C_1$-$C_4$ alkyl. Among these are methyl, propyl, isopropyl, n-butyl, and isobutyl groups, with methyl being preferred among these. If an inert substitutent group is present, it is preferred to have no more than one such group per cyclohexane ring. Most preferably, all R groups are hydrogen, and the compound is unsubstituted. One example of such initiator is 4,4'-methylenebis(2-methylcyclohexanamine) commercially available as Laromin® C 260.

The 1,3- or 1,4-bis(aminomethyl)cyclohexane initiator compound can be represented by the following structures:

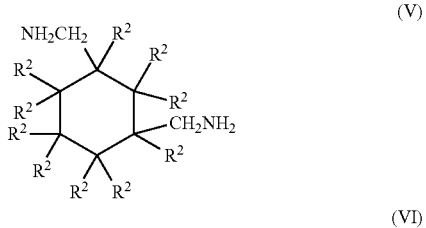

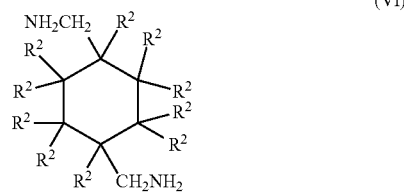

wherein each $R^2$ is as previously defined. An example of such an initiators is 1,3-bis(aminomethyl)cyclohexane commercially available as 1,3-BAC.

Other amine-initiators which can be used include 2- or 4-alkylcyclohexane-1,3-diamine wherein the alkyl group contain 1 to 4 carbon atoms.

Examples of other polyols which may be included in the polyol component are polythio-ether-polyols, polyesteramides, hydroxyl-containing polyacetals and hydroxyl-containing aliphatic polycarbonates, and preferably polyesterpolyols and polyether-polyols. Other selections may include mixtures of at least two of the above-mentioned polyhydroxyl compounds and with polyhydroxyl compounds having hydroxyl numbers of less than 100.

Suitable polyester-polyols may be prepared from, for example, organic dicarboxylic acids having from about 2 to about 12 carbon atoms, preferably aromatic dicarboxylic acids having from 8 to 12 carbon atoms and polyhydric alcohols, preferably diols having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, and preferably phthalic acid, isophthalic acid, terephthalic acid and the isomeric naphthalene-discarboxylic acids. The dicarboxylic acids may be used either individually or mixed with one another. The free dicarboxylic acids may also be replaced by the corresponding dicarboxylic acid derivatives, for example, dicarboxylic esters of alcohols having 1 to 4 carbon atoms or diarboxylic anhydrides. Preference is given to dicarboxylic acid mixtures comprising succinic acid, glutaric acid and adipic acid in ratios of, for example, from 20 to 35:35 to 50:20 to 32 parts by weight, and adipic acid, and in particular mixtures of phthalic acid and/or phthalic anhydride and adipic acid, mixtures of phthalic acid or phthalic anhydride, isophthalic acid and adipic acid or dicarboxylic acid mixtures of succininc acid, glutaric acid and adipic acid and mixtures of terephthalic acid and adipic acid or dicarboxylic acid mixtures of succinic acid, glutaric acid and adipic acid. Examples of dihydric and polyhydric alcohols, in particular diols, are ethanediol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane. Preference is given to ethanediol, diethylene glycol, 1,4-butanediol, 1,5-pentanediol, 1,6-hexanediol or mixtures of at least two of said diols, in particular mixtures of 1,4-butanediol, 1,5-pentanediol and 1,6-hexanediol. Furthermore, polyester-polyols made from lactones, e.g., ε-caprolactone or hydroxycarboxylic acids, e.g., ω-hydroxycaproic acid and hydrobenzoic acid, may also be employed. Such polyesters will generally contain primary hydroxyl groups.

The polyester-polyols may be prepared by polycondensing the organic, e.g., aliphatic and preferably aromatic polycarboxylic acids and mixtures of aromatic and aliphatic polycarboxylic acids, and/or derivatives thereof, and polyhydric alcohols without using a catalyst or preferably in the presence of an esterification catalyst, expediently in an inert gas atmosphere, e.g., nitrogen, carbon monoxide, helium, argon, inter alia, in the melt at from about 150 to about 250° C., preferably from 180 to 220° C., at atmospheric pressure or under reduced pressure until the desired acid number, which is advantageously less than 10, preferably less than 2, is reached. In a preferred embodiment, the esterification mixture is polycondensed at the abovementioned temperatures under atmospheric pressure and subsequently under a pressure of less than 500 mbar, preferably from 50 to 150 mbar, until an acid number of from 80 to 30, preferably from 40 to 30, has been reached. Examples of suitable esterification catalysts are iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainers, e.g., benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1:1.8, preferably from 1:1.05 to 1:1.2. The polyester-polyols preferably have a functionality of from 2 to 3 and a hydroxyl number of from 150 to 600, in particularly, from 200 to 400.

Polyhydroxyl compounds used are in particular polyether-polyols prepared by known processes, for example, by either anionic or cationic polymerization, with catalysts such as KOH, CsOH, boron trifluoride, or a double cyanide complex (DMC) catalyst such as zinc hexacyanocobaltate or quaternary phosphazenium compound. In the case of alkaline catalysts, these alkaline catalysts may be removed from the polyol at the end of production by a proper finishing step, such as coalescence, magnesium silicate separation or acid neutralization.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternatively one after the other, or as mixtures. In general, when preparing the amine-initiated polyols, the alkylene oxide is primarily propylene oxide. Examples of non-amine initiator molecules are water, organic dicarboxylic acids such as succinic acid, adipic acid, phthalic acid and terephthalic acid, and a variety of amines, including but not limited to aliphatic and aromatic, and polyhydric alcohols, in particular dihydric and/or trihydric alcohols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose, polyhydric phenols, for example, 4,4'-dihydroxydiphenylmethane and 4,4'-dihydroxy-2,2-diphenylpropane, resols, for example, oligomeric products of the condensation of phenol and formaldehyde, and Mannich condensates of phenols, formaldehyde and dialkanolamines, and melamine.

It is advantageous in some embodiments that polyols in the polyol component which are not initiated with an amine-initiator have a functionality of from 2 to 8 and a hydroxyl number of from 100 to 850. In a further embodiment, the primary hydroxyl groups in the polyol blend comprise greater than 10 percent of the total hydroxyl groups as the primary hydroxyl groups tend to increase the reaction rate.

Another component in the polyol formulation is a surfactant or a combination of surfactants. Inclusion of a surfactant in the formulation helps to emulsify the liquid components, regulate cell size, and stabilize the cell structure to prevent collapse and sub-surface voids. Suitable surfactants may include, but are not limited to, silicon-based compounds such as silicone oils and organosilicone-polyether copolymers, such as polydimethyl siloxane and polydimethylsiloxane-polyoxyalkylene block copolymers, e.g., polyether modified polydimethyl siloxane. Other suitable selections may include silica particles and silica aerogel powders, as well as organic surfactants such as nonylphenol ethoxylates and VORASURF™ 504, which is an ethylene oxide/butylene oxide block co-polymer having a relatively high molecular weight or those described in EP 1790682 by Evonik Many surfactant products sold under tradenames such as DABCO™ and TEGOSTAB™ may be useful in the inventive formulations. These surfactants are generally used in an amount of 0.01 to 6 parts by weight based on 100 parts by weight of the polyol component.

Other suitable polyether-polyols are melamine/polyether-polyol dispersions as described in EP-A-23 987 (U.S. Pat. No. 4,293,657), polymer/polyether-polyol dispersions prepared from polyepoxides and epoxy resin curing agents in the presence of polyether-polyols, as described in DE 29 43 689 (U.S. Pat. No. 4,305,861), dispersions of aromatic polyesters in polyhydroxyl compounds, as described in EP-A-62 204 (U.S. Pat. No. 4,435,537) and DE-A 33 00 474, dispersions of organic and/or inorganic fillers in polyhydroxyl compounds, as described in EP-A-11 751 (U.S. Pat. No. 4,243,755), polyurea/polyether-polyol dispersions, as described in DE-A-31 25 402, tris(hydroxyalkyl) isocyanurate/polyether-polyol dispersions, as described in EP-A-136 571 (U.S. Pat. No. 4,514,426), and crystallite suspensions, as described in DE-A-33 42 176 and DE-A-33 42 177 (U.S. Pat. No. 4,560,708). Other types of dispersions that may be useful in the present invention include those wherein nucleating agents, such as liquid perfluoroalkanes and hydrofluoroethers, gases such as nitrogen or a noble gas, and inorganic solids, such as unmodified, partially modified and modified clays, including, e.g., spherical silicates and aluminates, flat laponites, montmorillonites and vermiculites, and particles comprising edge surfaces, such as sepiolites and kaolinite-silicas. Organic and inorganic pigments and compatibilizers, such as titanates and siliconates, may also be included in useful polyol dispersions. Porous solids, such as those disclosed in publication WO 2009/092505, may also be incorporated into the foam forming formulations as nucleating agents. Such nucleating agents are reported to improve insulating properties.

The total polyol formulation generally has a viscosity at 25° C. of at least about 5,000 cP, as measured according to ASTM D455, meaning it is a relatively viscous material prior to contacting the other components of the foam-forming formulation. In some embodiments, a higher viscosity, of at least about 6,000 cP, may be preferable. An upper viscosity limit may be dictated by practicality and equipment limitations, but for most purposes a polyol system viscosity of less than about 20,000 cP, and more typically 15,000 cP, is generally suitable.

The formulation of the invention also includes at least one physical blowing agent, which is necessary to both foam the formulation and which also desirably serves to enhance the thermal insulation capability of the final rigid polyurethane foam. Water, a chemical blowing agent, which forms carbon dioxide when reacted with an isocyanate, may also be included as a second blowing agent, in an amount not exceeding 2 percent, based on the weight of the polyol formulation. In a further embodiment, water is present in an amount of less than 1.6 percent, based on the weight of the polyol formulation. Limitation of the amount of water serves to reduce the overall exotherm of the foam-forming reaction, while at the same time enhancing the thermal insulation and mechanical properties of the foam and its dimensional stability at low temperatures. Carbon dioxide may also be provided by means of adducts of $CO_2$, such as carbamates, may also be added to the foam formulations.

Among possible selections for the physical blowing agent are liquid $CO_2$, cycloalkanes including, in particular, cyclopentane, cyclohexane, and mixtures thereof; other cycloalkanes having a maximum of 4 carbon atoms; dialkyl ethers, cycloalkylene ethers, fluoroalkanes, and mixtures thereof. Specific examples of alkanes are, e.g., propane, n-butane, isobutane, n- and isopentane and technical-grade pentane mixtures, cycloalkanes, for example, cyclobutane, dialkyl ethers, for example, dimethyl ether, methyl ethyl ether, methyl butyl ether and diethyl ether, cycloalkylene ethers, for example, furan, and fluoroalkanes which are believed to be broken down in the troposphere and therefore are presently assumed to not damage the ozone layer, for example, trifluoromethane, difluoromethane, difluoroethane, tetrafluoroethane, and hepta-fluoropropane.

The physical blowing agents may, as noted hereinabove, be used alone or, preferably, in combination with water. The following combinations have proven highly successful and are therefore preferred: water and cyclopentane, water and cyclopentane or cyclohexane or a mixture of these cyclohexanes and at least one compound from the group consisting of n-butane, isobutane, n- and isopentane, technical-grade pentane mixtures, cyclobutane, methyl butyl ether, diethyl ether, furan, trifluoromethane, difluoromethane, difluoroethane, tetrafluoroethane, and heptafluoropropane. A low-boiling compound having a boiling point below about 40° C., which is homogeneously miscible with cyclopentane or cyclohexane, may be used to improve the overall foam and/or its processability. Such blowing agents are described in EP-A-0 421 269 (U.S. Pat. No. 5,096,933).

Other suitable non-chlorofluorocarbon physical blowing agents are blowing agent-containing emulsions having a long shelf life, which contain at least one low-boiling, fluorinated or perfluorinated hydrocarbon having from 3 to 8 carbon atoms, which is sparingly soluble or insoluble in any of the required formulation components, sulfur hexafluoride or mixtures thereof, and at least one formulation component, as described in EP-A-0 351 614 or emulsions of mixtures of the abovementioned low-boiling, fluorinated or perfluorinated hydrocarbon having 3 to 8 carbon atoms which is sparingly soluble or insoluble in the formative components, and at least one isoalkane having 6 to 12 carbon atoms or cycloalkane having 4 to 6 carbon atoms or cycloalkane having 4 to 6 carbon atoms and at least one formative component, for example, as described in DE-A-41 43 148.

The requisite amount depends on the course of the boiling-point curve of the mixture and may be determined experimentally by known methods. However, in certain embodiments rigid polyurethane foams having desirable densities and low thermal conductivity may be obtained where the blowing agent is cyclopentane, in an amount from about 3 to about 22 parts by weight, preferably from 5 to 21, more preferably from 8 to 20, parts by weight, based on 100 parts of the polyol system, combined with water in an amount of from 0 to 1.6 parts by weight, preferably from 0.1 to 1.5 parts by weight, and particularly from 0.2 to 1.5 parts by weight, on the same basis. Where a low-boiling compound which is homogeneously miscible with both the cyclopentane or cyclohexane is included, e.g., an alkane, such as iso-pentane or butane; cycloalkane having a maximum of 4 carbon atoms, dialkyl ether, cycloalkylene ether, fluoroalkane, or a mixture thereof. Such low-boiling compounds when used are present in an amount of from 0.1 to 18 parts by weight, preferably from 0.5 to 15 parts by weight, and in particular from 1.0 to 12 parts by weight, on the same basis. Examples of hydrofluorocarbon blowing agents. include 245fa, 134a, 365mfc, 227a and combinations thereof.

In order to produce the rigid polyurethane foams of the invention, the non-chlorofluorocarbon blowing agent(s), in combination with water, is/are introduced via known methods into at least one of the formulation components prior to initiation of the final foam-forming reaction. Introduction into such component may be carried out under pressure if desired. It is also possible to introduce the blowing agent or blowing agent mixture directly into the reaction mixture, expediently by means of a suitable mixing device.

In order to expedite the foam-forming reacting, both a blowing catalyst and a curing catalyst are preferably included in the formulation. While it is known that some catalysts may promote both blowing and curing (so-called "balanced" catalysts), such are conventionally differentiated by their tendency to favor either the urea (blow) reaction, in the case of the blowing catalyst, or the urethane (gel) reaction, in the case of the curing catalyst. In some non-limiting embodiments, a catalyst that technically may catalyze both blowing and curing may be selected for its less-favored tendency, e.g., curing, and combined with another catalyst directed more toward the other purpose, e.g., blowing, and vice versa.

Examples of suitable blowing catalysts that may tend to favor the urea (or water+isocyanate) reaction are short chain tertiary amines or tertiary amines containing at least an oxygen and may include bis-(2-dimethylaminoethyl)ether; pentamethyldiethylene-triamine, triethylamine, tributyl amine, N,N-dimethylaminopropylamine, dimethylethanolamine, N,N,N',N'-tetra-methylethylenediamine, or urea. In one embodiment, a combination of bis(dimethylaminoethyl)ether in dipropylene glycol may be an effective blowing catalyst, for example, in a 70/30 weight percent ratio. Combinations of any of the above may also be selected.

Examples of suitable curing catalysts that may tend to favor the urethane or polyol+isocyanate (gel or string) reaction include, generally, amidines, organometallic compounds, and combinations thereof. These may include, but are not limited to, amidines such as 1,8-diazabicyclo[5.4.0]undec-7-ene and 2,3-dimethyl-3,4,5,6-tetrahydropyrimidine, and their salts.

Organometallic compounds may include organotin compounds, such as tin(II) salts of organic carboxylic acids, e.g., tin(II) diacetate, tin(II) dioctanoate, tin(II) diethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate. Bismuth salts of organic carboxylic acids may also be selected, such as, for example, bismuth octanoate. The organometallic compounds may be selected for use alone or in combinations, or, in some embodiments, in combination with one or more of the highly basic amines listed hereinabove.

Example of catalysts able to promote both blowing and curing reactions are cyclic tertiary amines or long chain amines containing several nitrogens such as, dimethylbenzylamine, N-methyl-, N-ethyl-, and N-cyclohexylmorpholine, N,N,N',N'-tetramethylbutanediamine and -hexanediamine, bis(dimethylamino-propyl)urea, dimethylpiperazine, dimethylcyclohexylamine, 1,2-dimethyl-imidazole, 1-azabicyclo[3.3.0]octane, triethylenediamine (TEDA). In one embodiment, 1,4-diazabicyclo[2.2.2]octane (TEDA) is used.

Another class of catalysts for both blowing and curing reactions are alkanolamine compounds, such as triethanolamine, triisopropanolamine, N-methyl- and N-ethyldiethanolamine, and dimethylethanolamine may also be selected. Combinations of any of the above may also be effectively employed. Some of these catalysts are also acting as crosslinkers when they contain more than one reactive hydrogen. This is the case, for instance, of triethanolamine.

Examples of commercially available blowing, curing or blowing/curing catalyst include NIAX A-4, NIAX A6, POLYCAT 6, POLYCAT 5, POLYCAT 8, Niax A1; POLYCAT 58, DABCO T, DABCO NE 300, TOYOCAT RX 20, DABCO DMDEE, JEFFCAT ZR 70, DABCO™ 33 LV, NIAX A-33, DABCO R-8020, NIAX TMBDA, POLYCAT 77, POLYCAT 6, POLYCAT 9, POLYCAT 15, JEFFCAT ZR 50, TOYOCAT NP, TOYOCAT F94, DABCO NEM, etc. POLYCAT and DABCO catalysts are available from Air Products; TOYOCAT catalysts are available from Tosho Corporation; NIAX Catalysts are available from Momentive Performance Material; and JEFFCAT catalysts are available from Huntsman.

A third class of catalysts is the trimerization catalyst, able to promote reaction of isocyanate on itself. tris(dialkylaminoalkyl)-s-hexahydrotriazines such as 1,3,5-tris(N,N-dimethylaminopropyl)-s-hexahydrotriazine; DABCO TMR 30, DABCO K 2097; DABCO K15, Potassium acetate, potassium octoate; POLYCAT 41, POLYCAT 43, POLYCAT 46, DABCO TMR, CURITHANE 352, tetraalkylammonium hydroxides such as tetramethylammonium hydroxide; alkali metal hydroxides such as sodium hydroxide; alkali metal alkoxides such as sodium methoxide and potassium isopropoxide; and alkali metal salts of long-chain fatty acids having 10 to 20 carbon atoms and, in some embodiments, pendant hydroxyl groups. While these trimerization catalysts can be added to the other blowing and curing catalysts to boost foam reactivity, these are not required for the present invention.

Some of these catalysts are solids or crystals and can be dissolved in the proper solvent which can be the polyol, water, blowing agent, dipropylene glyocol or any other carrier with the polyurethane foaming composition. The amine catalyst can be reactive with isocyanate (to reduce VOC's) through hydroxyl and/or amine based reactive hydrogen's and could have a MW up to 300 with a functionality of 1 to 3.

In one particular embodiment, the combined amount of the blowing and curing catalysts, not considering the solvents, is greater than about 1 percent, based on the weight of the polyol formulation. In some embodiments, the combined amount of blowing and curing catalysts is 1.5 percent by weight or greater of the polyol formulation. In yet another embodiment the amount of blowing and curing catalyst is greater than 1.7 percent by weight of the polyol formulation. Generally the level of blowing and curing catalyst is less than 5 percent of the polyol system. The amount of catalyst can vary based on the temperatures of the materials. For example, the higher the temperature, the lower the required catalyst level.

In one embodiment, the level of the amine catalyst selected is such that the weight percent of nitrogen in the catalyst system (Ncat) is from 0.3 to 1 percent of the total polyol formulation. In a further embodiment, the Ncat comprises 0.4 to 0.7 weight percent based on the polyol formulation, excluding the weight of the blowing agent. Ncat is calculated as follows: Ncat=number of nitrogen atoms in the catalyst multiplied by the atomic weight of nitrogen and multiplied by the weight percentage of the catalyst in the total polyol formulation (excluding the physical blowing agent) and divided by the molecular weight of the catalyst. In case of more than one type of amine catalyst in the formulation, the Ncat of the total polyol formulation is the sum of the Ncat of each of the individual amine catalysts. In a further embodiment, to obtain the rapid gel time in the present invention it has also been advantageously found the total amount of nitrogen from the polyol component and catalyst package (Npol+Ncat) should be from 1 to 6 weight percent of the polyol formulation. In a further embodiment, the ratio of Npol to Ncat is from 2 to 8. In another embodiment the Npol:Ncat ratio is less than 7.5. As it is desirable to minimize the amount of amine catalyst, in a further embodiment the Npol to Ncat ratio is greater than 2. The higher ratio of Npol to Ncat helps to reduce the foam Lambda, improves the demold post-expansion of the foam, and may reduce the VOC's generated during these fast foam rise conditions due to lower catalyst loading.

Another option to increase foam reactivity, especially foam gelation, is use metal salts as catalysts, such as SO (Stannous Octoate), DBTDL (Dibutyl Tin Dilaurate), bismuth neodecanoate, zinc naphtenate, etc. However these metal salts are not preferred due to increased environmental regulations.

The polyol formulation may include additional, optional components. Among these may be chain extenders and/or crosslinking agents. Both of these groups are usually represented by relatively short chain or low molecular weight molecules such as hydroquinone di(β-hydroxyethyl)ether, glycerine, ethylene glycol (EG), diethylene glycol (DEG), triethylene glycol, tetraethylene glycol, propylene glycol, dipropylene glycol, tripropylene glycol, 1,3-propanediol, 1,3-butanediol, 1,4-butanediol (BDO), neopentyl glycol, 1,6-hexanediol, 1,4-cyclohexanedimethanol, ethanolamine, diethanolamine, methyldiethanolamine, phenyldiethanolamine, glycerol, trimethylolpropane (TMP), 1,2,6-hexanetriol, triethanol-amine, pentaerythritol, N,N,N',N'-tetrakis (2-hydroxypropyl)-ethylenediamine, diethyltoluenediamine, dimethylthiotoluenediamine, combinations thereof, and the like. Particularly frequently used are 1,4-butanediol (BDO), diethylene glycol (DEG), glycerine, 1,4-trimethylolpropane (TMP), and combinations thereof. Some molecules may contribute to both chain extension and crosslinking. When used, the chain extender and/or crosslinker may be used in amount up to 8 wt % of the polyol.

Additional formulation components may optionally be included, according to the desire of the practitioner. Such may include pigments and colorants; flame retardants; antioxidants; surface modifiers; bioretardant agents; mold release agents; combinations thereof; and the like.

Procedure to manufacture a refrigerator and/or a freezer consists of placing an empty housing consisting of an inner and outer liner, already conditioned in temperature, preferably between 40 to 45 deg C., using an oven, infra-red, hot air blowing, etc., in a mold fixture, closing the jig and injecting the reactants. Foam formulation is injected or poured inside the mold through one or more injection points to reduce the foaming distance to fill the mold. The current process can use two or more injection points. In one embodiment, a single injection point is used. Foam curing time depends on the formulation and/or process conditions. Usually demolding time is less than 10 minutes, preferably below 7 minutes, and more preferably below 5 minutes. The assembly line can be equipped with either movable or stationary fixtures. Molds for refrigerator doors are usually placed on a conveyor or on a carrousel and are foamed separately.

Enough of the foam formulation is introduced such that, after it has expanded, the resulting foam fills those portions of the cavity where foam is desired. Most typically, essentially the entire cavity is filled with foam. It is generally preferred to "overpack" the cavity slightly, by introducing more of the foam formulation than is minimally needed to fill the cavity, thereby increasing the foam density slightly. The overpacking provides benefits such as better dimensional stability of the foam, especially in the period following demold. Generally, the cavity is overpacked by from 5 to 35% by weight. The final foam density for most appliance applications is preferably in the range of from 28 to 40 kg/m³.

After the foam formulation has expanded and cured enough to be dimensionally stable, the resulting assembly can be "demolded" by removing it from the jig or other support that is used to maintain the shell and liner in their correct relative positions.

The formulation components may be combined and introduced into a mold or cavity in any way known in the art to produce a rigid polyurethane foam. In general, the polyol component is first combined with the blowing agent, water, blowing and curing catalysts, crosslinkers and/or chain extenders, surfactant, and any additional additives to form the polyol formulation which is quickly contacted with isocyanate to begin the foaming and polymerization reactions. An isocyanate index of from about 80 to about 200 is frequently conveniently employed; in some non-limiting embodiments, from about 90 to about 170; in other non-limiting embodiments, from about 100 to about 140. Those skilled in the art will be aware of various types of equipment to accomplish the contact while ensuring that an adequate level of mixing occurs to ensure uniformity of the final foam. One way to do this is to use a mixing injection head, wherein the isocyanate and polyol formulation are combined and mixed and then, more or less simultaneously, injected into the mold or cavity to be filled. The machine output is adjusted to get an injection, or pouring, time which is short enough to avoid intermingling of liquids and foams inside the mold cavity. Usually the shot time is below 10 seconds.

In one embodiment, the mold or cavity is filled from a single injection point while simultaneously, and/or prior to injection, drawing a vacuum from another point. The vacuum may maximize mold- or cavity-filling prior to the formulation's desirably rapid gel time, which in particular embodiments may be less than about 30 seconds, and in other embodiments may be less than about 25 seconds. In some embodiments it may be less than about 20 seconds.

Desirably a reduced atmospheric pressure inside the mold housing of from about 350 to about 850 millibars (mbar) may be employed, and more desirably from about 400 to about 800 mbar. (Atmospheric pressure at sea level is approximately 1013.25 mbar, or 101.325 kPa.). Art further describing application of a suitable reduced atmospheric pressure environment may be found in WO 2007/058793 A1; U.S. Pat. No. 5,972,260 A; WO 2006/013004 A1; WO 2006/013002 A1; and WO 2000/047384 A2. Where a mold is used, demolding may be carried out using standard methodologies, and where desirable, suitable external and/or internal mold release agents may be employed. Preferably no release agents are used with the present invention.

In another embodiment, the reactive foam-forming system is injected into a cavity at or above atmospheric pressure and a vacuum is then applied to the mold. In a further embodiment, the degree of vacuum may also be varied during the foaming process or can be adjusted to the cabinet design, the more intricate the design, the lower the applied vacuum.

In another embodiment the reduction of in mold pressure is applied before the reactive foam forming system is injected into the cavity of the housing and is maintained constant over time to compensate for weather variations and improve process conditions and foam consistency all year around.

In another embodiment the polyurethane rigid foam has good adhesion to the refrigerator housing once it is demolded and cured. This adhesion, determined by measuring the tensile bond strength based on the test method described herein, is at least 60 Kpa, preferably at least 80 KPa, more preferably at least 100 Kpa at the various positions inside the housing.

The formulation and process of the invention may be used to produce fine-celled, rigid polyurethane foams having a density of less than about 40 kg/m³. Density is measured according to ASTM 1622-88. For other applications such as pipe in pipe or water heater applications, the molded density will generally greater than 40 kg/m³ and may generally in the range of 60 to 90 kg/m³. The cells may, in certain non-limiting embodiments, be at least about 70 percent closed; in other non-limiting embodiments, at least about 80 percent closed; and in still other non-limiting embodiments, at least about 90 percent closed. The foams may also, in certain non-limiting embodiments, exhibit an average cell diameter of less than about 250 microns, and in some embodiments less than about 200 microns, and a thermal conductivity of less than about 19 mW/mK at 10° C. average plate temperature, according to ISO 12939/DIN 52612. In some embodiments a thermal conductivity of less than about 18.5 mW/mK at 10° C. average plate temperature may be achieved using a non ozone depleting agent. Such foams may be particularly useful for both molded and cavity-filling applications, such as in appliance insulating walls for uses such as, non-limiting embodiments, refrigerators, freezers, and hot water storage tanks.

The description hereinabove is intended to be general and is not intended to be inclusive of all possible embodiments of the invention. Similarly, the examples herein-below are provided to be illustrative only and are not intended to define or limit the invention in any way. Those skilled in the art will be fully aware that other embodiments, within the scope of the claims, will be apparent, from consideration of the specification and/or practice of the invention as disclosed herein.

Component Used in the Examples

Isocyanate

Voratec SD 100 A polymeric MDI with an NCO content of approximately 31% available from The Dow Chemical Company.

Polyol Formulation

Voratec SD 308 A formulated polyol with a hydroxyl number of 385 mg KOH/g, a viscosity at 25° C. of 3500 mPa·s and a water content of 2.3%, containing 5 wt % of an amine initiated polyol and 1.4 wt % of a blowing and curing catalyst, commercially available from The Dow Chemical Company.

Voranol RN 482 Propoxylated sorbitol with a hydroxyl number of 480 mg KOH/g, available from The Dow Chemical Company.

Voranol CP 1055 Propoxylated glycerol with a hydroxyl number of 156 mg KOH/g, available from The Dow Chemical Company.

Voranol RA 640 Propoxylated ethylenediamine with a hydroxyl number of 640 mg KOH/g, available from The Dow Chemical Company.

Stepanpol PS 3152 Aromatic polyester polyol available from Stepan Chemical and having a hydroxyl number of 315 mg KOH/g.

Tercarol 5903 Propoxylated toluenediamine with a hydroxyl number of 440 mg KOH/g, available from The Dow Chemical Company.

Glycerol Triol with a hydroxyl number of 1828 mg KOH/g.

Polyol A Propoxylated 1,2-cyclohexanediamine with a hydroxyl number of 495 mg KOH/g.

Pmdeta A blowing amine catalyst available from, e.g., Air Products & Chemicals Inc. (N,N,N',N',N-pentamethyldiethylenetriamine) as Polycat 5.

Dmcha An amine catalyst with blowing and curing characteristics available from, e.g., Air Products & Chemicals Inc. (Dimethylcyclohexylamine) as Polycat 8.

Dabco TMR-30 A trimerization catalyst, a mixture of Tris-2,4,6 ((dimethylamino)methyl)phenol and Bis-2,4,6-((dimethylamino)methyl)phenol, available from Air Products & Chemicals Inc.

Dabco K2097 A trimerization catalyst, alkali acetate-salt dissolved in DEG, available from Air Products & Chemicals Inc.

Polycat 41 A trimerization catalyst (tris(dimethylaminopropyl)-s-hexahydrotriazine) available from Air Product & Chemicals.

Silicone-A A rigid foam surfactant available from Momentive.

Cyclopentane 95% cyclopentane available from Halterman.

Parameters Determined During the Foaming Experiments are:

Free Rise Density The density measured from a 100×100×100 mm block obtained from the center of a free-rising foam (at ambient air pressure) produced from a total system formulation weight of 200 grams or more. FRD is reported in kg/m$^3$.

Foam Reactivity The foam reactivity is determined on free-rise foams, using a 20×20×20 cm mold, with a shot-weight of 200 grams. From these foams, made at ambient pressure, cream-time, gel-time and tack-free time are determined.

Cream time is the time lapse in seconds from the beginning of the mixing process until a visual change of the reactants (cloudiness and/or color change) occurs.

Gel time is the lapse of time in seconds from the beginning of the mixing process until a string can be pulled from the rising foam using a probe like a tongue depressor.

Tack free time is the lapse of time in seconds from the beginning of the mixing process until the top foam surface is not sticky anymore.

Viscosity Polyol Formulation viscosity, without the blowing agent, is measured according to ASTM D445 in mPa·s or cps. at 25 deg C., Minimum Fill Weight MFW is the minimum amount of foam needed to fill the insulation housing unit in grams.

Minimum Fill Density The density determined from the minimum weight needed to fill the mold completely and the volume of this mold. MFD is reported in kg/m$^3$. The minimum fill density is an indication of the ability to fill the mold or cavity. In the cabinet it is the minimum fill weight needed to just fill the cabinet (overpack=0%) divided by the volume of the cavity in the cabinet.

Molded Density The real measured injected weight of the foam divided by the volume of the cavity. In case of a refrigerator/freezer cabinet the empty housing is weighed prior to the foaming process and after injection of the foam the weight is determined again. The difference between the two results is the real injected foam weight, which when divided by the volume of the cavity results in the molded density of the foam in the cabinet. The molded density is reported in kg/m$^3$ Core Density The core density is measured by weighing foam samples after removing of the skin of the foam (+/−0.5 cm foam removed at top and bottom side of the sample) and dividing the weight by the volume of the sample. The core density is reported in kg/m$^3$.

Overpack The overpack is defined as [Molded density×100/Minimum Fill Density]. Overpack is reported in percent and has a typical value of 5-35 percent, depending on the physical blowing agent and the applied in-mold pressure.

Demold/Post Expansion For the determination of the productivity of a foam system demold-post-expansion measurements are performed. The reacting foam-forming system is injected in a mold of 70×35×10 cm. This mold is, as described above, also connected to the vacuum system to control the in-mold pressure. The foam system is demolded after 4, 5, 6 or 7 minutes, and the thickness of the foam is subsequently measured after 24 hours.

The post-expansion (=PE), which gives the expansion of the foam after demolding, is reported in mm. as the maximum thickness of the foam-sample from the mold minus the original thickness which is 100 mm. This is a metric to predict productivity of a foam-system during the actual production of refrigerator-freezer cabinets (cycle-time).

Pressure The pressures described in this invention may be either air pressures on the foam, air pressure inside the mold cavity or foam mass pressure on the mold. All pressures are reported in absolute pressure, with the unit bar or kilopascals (kPa).

Control Examples A to F

Six control foams (designated as Controls A to F), are prepared using the formulation amounts shown in Table 1, with all amounts given in parts by weight unless stated otherwise in the table. A high pressure Cannon machine equipped with a mix-head is attached to a mold injection hole, at the pressures indicated in the Table. The polyol component and additional formulation components are premixed and then injected, simultaneously with the isocyanate component, into a Brett mold at a mix-head pressure of at least 90 mbar. The temperature of the components is kept at 20° C.+/−2° C. The output of the machine is typically from about 150 to about 250 grams per second. The Brett mold is made of aluminum with a tempered glass lid with dimensions of 200×20×5 cm, which allows the creation of a reduced atmospheric pressure in the mold during foaming. The internal pressure of the mold is controlled via a pipe connected to a 500 liter buffer tank that is connected to a medium capacity vacuum pump (1500 l/min). The vacuum in the buffer tank, and thus the in-mold air pressure, is maintained with control valves. The foams produced in this Brett mold are typically are used to measure thermal conductivity (also termed "lambda"), compression strength, molded density, and density distribution. The temperature of the mold is about 45° C. Typical demold-time of the foams is in the range of from about 6 to about 10 minutes. A release agent is applied to the mold prior to filling in order to facilitate demolding. These examples are considered as comparative as this is the use of a Brett mold and does not involved a complex design and there is no inner/outer liner. These examples illustrate the effect of the Npol and Ncat amounts on the gel time and lambda values.

Foam samples are cut from the core of the molded part 24 hours after foam production and these samples are used for testing immediately after cutting. Lambda, i.e., thermal conductivity, is measured at 10° C. (average plate temperature) according to ISO 12939-01/DIN 52612, using a Lasercomp FOX 200. The core densities and free rise foam densities are measured according to ASTM 1622-88. Foam compressive strength in kPa is measured according to DIN 53421-06-84. Values reported are an average of five (5) samples taken from various positions of the Brett mold. Foam results are presented in table 2. Data with "/" indicates two different runs.

TABLE 1

|  | Control A | Control B | Control C | Control D | Control E | Control F |
|---|---|---|---|---|---|---|
| Voratec SD 308 | 100 | | | | | |
| TERCAROL 5903 | | | | 45 | | |
| STEPANPOL PS 3152 | | 14.8 | 14.8 | 14.8 | 14.8 | 30 |
| Voranol RA640 | | 5 | 5 | 5 | 5 | 5 |
| VORANOL RN 482 | | 58 | 58 | 17.7 | 17.6 | 25 |
| VORANOL CP 1055 | | 15 | 13 | 10 | 10.5 | 10 |
| Glycerol | | | | | | 3.4 |
| Polyol-A | | | | | 45 | 19 |
| Silicone-A | | 2.5 | 2.5 | 2.5 | 2.5 | 2.5 |
| Pmdeta | | 1.3 | 2.2 | 1.5 | 1.5 | 1.5 |
| Dmcha | | | 2.2 | 1.2 | 0.8 | 1.2 |
| Dabco TMR30 | | 0.8 | 0.8 | 0.6 | 0.6 | 0.7 |
| Dabco K 2097 | | | | 0.2 | 0.2 | 0.2 |
| Water | | 2.2 | 1.5 | 1.5 | 1.5 | 1.5 |
| Npol (%) | 0.4 | 0.4 | 0.4 | 3.235 | 3.28 | 1.616 |
| Ncat (%) | 0.4508 | 0.4423 | 0.903 | 0.5913 | 0.5473 | 0.6071 |
| Npol (%) + Ncat (%) | 0.851 | 0.842 | 1.303 | 3.826 | 3.827 | 2.223 |
| Ratio Npol/Ncat | 0.887 | 0.904 | 0.443 | 5.471 | 5.993 | 2.662 |
| Amine Polyol (%) | 5 | 5 | 5 | 50 | 50 | 24 |
| Amine Catalyst (%) | 2.1 | 2.1 | 5.2 | 3.3 | 2.9 | 3.4 |
| Blowing + Curing catalyst (%) | 1.4 | 1.3 | 4.4 | 2.7 | 2.3 | 2.7 |
| Amine Pol/(curing + blowing catalyst) ratio | 3.6 | 3.8 | 1.1 | 18.5 | 21.7 | 8.9 |
| Polyol Formulation Viscosity (25° C.) (cps) | 3500 | 4900 | 4800 | 13000 | 13700 | 5700 |
| Cyclopentane | 13 | 15 | 15 | 15 | 15 | 15 |
| Voratec SD 100 Iso | 145 | 144 | 132 | 132 | 132 | 132 |

TABLE 2

|  | Control A | Control B | Control C | Control D | Control E | Control F |
|---|---|---|---|---|---|---|
| Cream Time (seconds) | 3 | 4 | 3 | 3 | 2 | 2 |
| Gel Time (seconds) | 43 | 38 | 20 | 19 | 15 | 12 |
| Tack-free Time (seconds) | 63 | 66 | 25 | 23 | 19 | 14 |
| Free Rise Density (kg/m$^3$) | 22.0 | 21.1 | 23.7 | 23.8 | 24.4 | 22.5 |
| Observation during free rise foaming | Mild amine odor | Mild amine odor | Strong amine odor | Mild amine odor | Mild amine odor | Mild amine odor |
| MFD (kg/m$^3$) Ambient (0.95 bar) | 29.6 | 30.4 | 35.9 | 36.6 | 37.5 | 36.9 |
| MFD 0.75/0.7 bar pressure (kg/m$^3$) | — | — | 30.3/29.0 | 31.5/30.3 | 32.1/30.8 | 31.0/29.7 |
| Molded Density (kg/m3) | 33.3 | 35.1 | 36.3/34.1 | 37.9/34.9 | 38.6/34.5 | 37.4/34.7 |
| In-mold Pressure (bar) | 0.95 | 0.95 | 0.75/0.7 | 0.75/0.7 | 0.75/0.7 | 0.75/0.7 |
| Compressive Strength (kPa) | 133 | 127 | 135/123 | 148/121 | 141/105 | 112/102 |
| Lambda (10° C.) (mW/mK) | 20.0 | 19.5 | 19.1/19.1 | 18.1/18.1 | 18.0/18.5 | 18.0/18.2 |

TABLE 3

|  | Control A | Control B | Control C | Control D | Control E | Control F |
|---|---|---|---|---|---|---|
| In-mold pressure (bar) | 0.95 | 0.95 | 0.75 | 0.75 | 0.75 | — |
| Post-Expansion (DMT = 4 min.) (mm) | 10.4 | 12.1 | 11.6 | 8.4 | 9.6 | — |
| Post Expansion (DMT = 5 min.) (mm) | — | 9.9 | 9.1 | 7.3 | 7.6 | — |
| PE (DMT = 6 min.) (mm) | 7.4 | 8.8 | 8.5 | 6.1 | 7.4 | — |
| PE (DMT = 7 min.) (mm) | 6.4 | 8.2 | 7.4 | 5.4 | 6.2 | — |

The results show with increase in the Npol (%)+Ncat (%) in control example C to F improved lambda values are obtained with reduced gel times is observed versus control A and B. The foam of control D to F are better than foam control C due to the higher Npol (%) value and the increased ratio Npol/Ncat. Furthermore the foams of control D and E show improved demold/post expansion results. In addition, the foams of D to F have a perceived lower amine odor versus foam control C.

Examples 1-2

Examples 1 to 2 and comparative examples 1C and 2C of table 4 are all refrigerator productions using different types of combi-refrigerator cabinet units, with a plastic inner-liner and a steel metal sheet as outer-liner. A combi indicates the cabinet has both a cold and a freezer section in a top/bottom combination. Comparative examples 1C, and 2C are produced with the same cabinet housings as Example 1 and 2 respectively but at atmospheric pressure where the examples are produced with a reduced in-mold pressure. The dimensions of the cabinets and properties of the foaming process are given in table 4. The composition of the reference and experimental polyol combinations, comparable to control examples D to F, are given in Tables 5 and 6.

The combi-refrigerator cabinets are filled through a single injection point. The conditions for injection of the formulations into the housing units are as follows: The mix-pressure is in all cases 150 bar+/−10 bar. The output for Comparative 1C and Example 1 is 1850 g/s, and for Comparative 2C and Example 2 1600 g/s. The mold temperature is 45. deg. C.

The tensile bond strength is measured based on the EN 14509 norm and is a metric for adhesion. The tensile bond strength is determined on samples of 10×10× thickness (cm), which includes the inner and outer liner adhered to the foam during the filling of the cavity of the refrigerator cabinet. These cabinet units are cured for at least 72 hours after production. Foam slices including liners are then cut at various locations, hence different distances from the injection point. These foam slices are glued to clamps and pulled with a dynamometer to record the breaking force in KPa, Strength. From each unit a minimum of 6 samples and a maximum of 12 samples are measured, taken from different positions in the cabinet, and an average value is reported in Table-4.

For compressive strength measurements, they are taken from foam samples with a 10×10 cm surface area. The compressive strength values reported in table 4 are an average value of at least 6 and up to 12 samples taken from different positions in the cabinet. The compressive strength value is only measured in the thickness direction, so perpendicular from the usual foam flow direction. The values of core density and Lambda are average values from at least 6 and up to a maximum of 12 measurements taken from different positions in the cabinet.

The OH-number of the polyol formulation is measured based on the ASTM D4274D norm. The Water content of the polyol is measured according to the ASTM D4672 norm.

The Reverse Heat Leakage (RHL) of an appliance is determined as a measure of the contribution of the insulating foam on the energy efficiency of the appliance. The appliance is put into a climate controlled environment and the inside of the appliance is brought to a fixed temperature which is higher than the controlled outside temperature. The inside temperature in the appliance is maintained during the test with a heating element. After reaching steady-state conditions the heating coil power input is measured and averaged over a 24 hour period. The Reverse Heat Leakage (RHL) is the amount of energy going into the heating element (W) normalized for the temperature difference between the inside and outside of the appliance.

TABLE 4

|  | 2-Door Cabinet | 2-Door Cabinet |
|---|---|---|
| Model | Combi | Combi |
| Height (cm) | 200 | 189.5 |
| Width (cm) | 59 | 59.5 |
| Depth (cm) | 53 | 64 |
| Wall thickness, minimum-maximum (cm) | ~5-8 | ~3-7 |
| Outer liner | Steel-Metal | Steel-Metal |
| Inner-liner | HIPS | HIPS |

TABLE 4-continued

| Polyol-system | Comparative 1C | Example 1 | Comparative 2C | Example 2 |
|---|---|---|---|---|
| Cream time (s) | 6 | 1 | — | — |
| Gel-time (s) | 43 | 16 | 38 | 18 |
| Tack free time (s) | 70 | 20 | — | — |
| Free Rise Density (kg/m3) | 23.5 | 25.5 | 21.1 | 24.3 |
| Temperature Iso/Pol (° C.) | 20/20 | 17/17 | 20/20 | 20/20 |
| Minimum Fill Weight (g) | 6900 | 6200 | 3930 | 3810 |
| Minimum Fill Density (kg/m3) | 28.4 | 25.6 | 29.1 | 28.2 |
| In-mold pressure (bar) | 1.0 | 0.8 | 1.0 | 0.75 |
| Demold time (min.) | 6.5 | 5 | 4 | 3 |
| Molded Density (kg/m3) | 36 | 36 | 35.5 | 35.5 |
| Core Density average (kg/m3) | 31.0 | 32.5 | 31.1 | 31.9 |
| Tensile Bond Strength avg. (kPa) | 118 | 112 | 130 | 166 |
| Compressive Strength avg. (kPa) | 182 | 151 | 128 | 132 |
| Lambda (10° C.) avg. (mW/mK) | 20.2 | 18.5 | 20.0 | 18.6 |
| RHL-Cooler section (W/K) | 0.91 | 0.86 | | |
| % improvement RHL-Cooler | | 5.5 | | |
| RHL-Freezer section (W/K) | 0.47 | 0.44 | | |
| % improvement RHL-Freezer | | 6.4 | | |

TABLE 5

| | Amine initated polyol (wt %) | Amine Catalyst (wt %) | Blowing + Curing catalyst (wt %) | Ncat (%) | Npol (%) | Npol/Ncat ratio |
|---|---|---|---|---|---|---|
| Comparative 1C | 5 | 2.45 | 1.8 | 0.367 | 0.400 | 1.090 |
| Comparative 2C | 5 | 2.0 | 1.3 | 0.427 | 0.310 | 0.726 |
| Experimental system 1 | 48 | 2.4 | 1.9 | 0.585 | 3.024 | 5.169 |
| Experimental system 2 | 47 | 2.3 | 1.8 | 0.560 | 2.961 | 5.288 |

TABLE 6

| | OH-value of Polyol component (mg KOH/g) | Water content (wt %) | Polyol Viscosity at 25° C. (cps) | Cyclopentane (on 100 pbw polyol) | Voratec SD 100 Iso (on 100 pbw Polyol |
|---|---|---|---|---|---|
| Comparative 1C | 385 | 2.3 | 3900 | 14 | 145 |
| Comparative 2C | 369 | 2.5 | 3700 | 14.5 | 144 |
| Experimental system 1 | 420 | 1.2 | 14600 | 16 | 143 |
| Experimental system 2 | 413 | 1.2 | 13500 | 16 | 136 |

Examples 1 and 2 show that when applying a reduced in-mold pressure prior and/or during foaming, the cavity of the combi refrigerator/freezers can be surprisingly filled at equal densities as the comparatives with fast reacting, high viscous foam formulations with a low water content. This can be accomplished with a gel time lower than 30 seconds by selection of the proper ratio of Npol/Ncat. The MFW and MFD are even lower in the examples indicating the surprisingly good flow properties of the foam. The examples show in all cases the improvement in thermal conductivity (lambda) versus the comparatives, as well as a significant improvement in the outcome of the Reverse Heat Leakage test. In particular, the energy efficiency or Reverse Heat Leakage of an appliance is improved by at least 5% compared to standard foam system. Tensile bond strengths (adhesion) of the very fast reacting foam system are also surprisingly good, considering the reactivity including the tack free time.

The invention claimed is:

1. A process for preparing an insulating unit comprising at least two side walls, a back wall and a top wall wherein each wall comprises a polyurethane foam between an inner lining and an outer lining and the side walls are connected to the back wall and the top wall at an angle between 85 and 95°; the back wall and the side walls have a height of between 0.5 and 3 meters and the side walls have a width of between 0.5 and 1.5 meters and the back wall has a width of between 0.5 and 2.0 meters and wherein the polyurethane foam disposed between the inner and outer liner has a thickness of 20 to 120 mm and is produced from a reaction mixture comprising;

(a) preparing a reactive foam-forming system comprising as components at least an organic polyisocyanate; and a polyol formulation comprising a 1) polyol component that includes a mixture of polyols, the polyol component containing from 5 to 85 percent by weight of the polyol component of at least one amine-initiated polyol, said at least one amine-initiated polyol having a nominal average functionality of 3 to 8 and an average hydroxyl number of from 200 to 850, 2) from 1 to 5 parts by weight of the polyol formulation of a catalyst system per 100 parts by weight of the polyol component wherein the catalyst system comprises at least one amine catalyst, 3) an amount of water that is less than 2 percent by weight based on the weight of the polyol formulation, 4) at least one surfactant, and 5) a non-chlorofluorocarbon physical blowing agent;

wherein the weight percent of nitrogen derived from the at least one amine-initiated polyol having a nominal average functionality of 3 to 8 and an average hydroxyl number of from 200 to 850 (Npol), based on the combined weight of components 1), 2), 3) and 4) of the polyol formulation, is from is from 1.4 to 5 and the ratio of Npol to the weight percent nitrogen from the catalyst system (Ncat), based on the combined weight of components 1), 2), 3) and 4) of the polyol formulation, is from 2 to 8;

(b) injecting the reactive foam-forming system into a cavity;

(c) before, curing or after step (b) subjecting the cavity to a reduced atmospheric pressure of 350 to 850 millibars; and (d) wherein the reactive foam-forming system forms a gel in no more than 30 seconds and the reduced atmospheric pressure is maintained at least until the gel forms a closed cell rigid polyurethane foam, the foam having a density of from 28 to 40 kg/m$^3$, an average cell diameter of less than about 250 microns, a thermal conductivity of less than about 19 mW/mK at 10° C. average plate temperature, according to ISO 12939/DIN. 52612.

2. The process of claim 1 wherein the amine-initiated polyol is prepared by addition of an alkylene oxide to an aromatic amine; a cyclo-aliphatic amine; methylene bis(cyclohexylamine; 1,2-, 1,3- or 1,4-bis(aminomethyl)cyclohexane; an aminocyclohexanealkylamine; 2- or 4-alkylcyclohexane-1,3-diamine; isophorone diamine or a combination thereof.

3. The process of claim 1 wherein the amine-initiated polyol comprises from 18 to 60 weight percent of the polyol component.

4. The process of claim 1 wherein the nitrogen present in the polyol formulation comprises from 1.4 to 5 weight percent of the combined weight of components 1), 2), 3) and 4) of the polyol formulation.

5. The process of claim 1 wherein Ncat comprises 0.3 to 0.7 weight percent of the combined weight of components 1), 2), 3) and 4) of the polyol formulation.

6. The process of claim 5 wherein the ratio of Npol to Ncat is from 2.2 to 6.

7. The process of claim 6, wherein the catalyst system comprises a blowing and curing catalyst is selected from dimethylbenzylamine, N-methyl-, N-ethyl-, and N-cyclohexylmorpholine, N,N,N',N'-tetramethylbutanediamine and -hexanediamine, bis(dimethylamino-propyl)urea, dimethylpiperazine, dimethylcyclohexylamine, 1,2-dimethyl-imidazole, 1-aza-bicyclo[3.3.0]octane, triethylenediamine, or a combinations thereof.

8. The process of claim 1 wherein Npol+Ncat is from 3 to 6.

9. The process of claim 1, wherein the inner liner is high impact polystyrene.

10. The process of claim 1, wherein the closed cell rigid polyurethane foam is adhered to said inner and outer linings at a tensile bond strength of at least 100 Kpa as measured based on the EN 14509 norm.

11. The process of claim 1, wherein the nonchlorofluorocarbon physical blowing agent is cyclopentane, which is present in a amount of 3 to 22 parts by weight per 100 parts by weight of the polyol formulation, and the water is present in an amount of 0.2 to 1.5 parts by weight per 100 parts by weight of the polyol formulation.

* * * * *